United States Patent
Suzuki

(10) Patent No.: US 8,386,922 B2
(45) Date of Patent: Feb. 26, 2013

(54) INFORMATION PROCESSING APPARATUS AND INFORMATION PROCESSING METHOD

(75) Inventor: Wataru Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 189 days.

(21) Appl. No.: 12/767,892

(22) Filed: Apr. 27, 2010

(65) Prior Publication Data

US 2010/0293452 A1    Nov. 18, 2010

(30) Foreign Application Priority Data

May 13, 2009   (JP) ................................. 2009-117051

(51) Int. Cl.
*G06F 17/00* (2006.01)

(52) U.S. Cl. ........ 715/234; 715/200; 715/239; 715/249; 715/250; 715/253; 715/255

(58) Field of Classification Search .................. 715/200, 715/234, 239, 249, 250, 253, 255
See application file for complete search history.

(56) References Cited

U.S. PATENT DOCUMENTS

| | | | |
|---|---|---|---|
| 6,067,097 A * | 5/2000 | Morita et al. ................. 345/505 |
| 6,100,998 A * | 8/2000 | Nagao et al. .................. 358/1.9 |
| 6,535,896 B2 * | 3/2003 | Britton et al. ................ 715/239 |
| 6,829,745 B2 * | 12/2004 | Yassin et al. ................. 715/236 |
| 6,895,289 B2 * | 5/2005 | Shimizu et al. ................. 700/87 |
| 7,043,686 B1 * | 5/2006 | Maruyama et al. ........... 715/242 |
| 7,403,951 B2 * | 7/2008 | Setlur et al. ........................ 1/1 |
| 7,509,570 B2 * | 3/2009 | Narusawa .................... 715/211 |
| 7,515,306 B2 * | 4/2009 | Nakatsuka .................... 358/3.27 |
| 7,525,544 B2 * | 4/2009 | Whatmough ................. 345/428 |
| 7,661,063 B2 * | 2/2010 | Iwasaki ........................ 715/234 |
| 7,707,492 B2 * | 4/2010 | Zaharkin ...................... 715/236 |
| 7,991,853 B2 * | 8/2011 | Miyoshi et al. ............... 709/219 |
| 8,077,164 B2 * | 12/2011 | Matsuda ....................... 345/177 |
| 2002/0023113 A1 * | 2/2002 | Hsing et al. ................... 707/513 |
| 2003/0109943 A1 * | 6/2003 | Shimizu et al. ................. 700/87 |
| 2004/0110490 A1 * | 6/2004 | Steele et al. ................ 455/412.1 |
| 2005/0206937 A1 * | 9/2005 | Hirabayashi ................. 358/1.13 |
| 2005/0251738 A1 * | 11/2005 | Hirano et al. ................. 715/514 |
| 2006/0152511 A1 * | 7/2006 | Whatmough ................. 345/473 |
| 2006/0168519 A1 * | 7/2006 | Torii et al. .................... 715/523 |
| 2006/0280373 A1 * | 12/2006 | Uchida ......................... 382/243 |

(Continued)

FOREIGN PATENT DOCUMENTS

JP     2002-297569 A    10/2002

OTHER PUBLICATIONS

Collins, John "Basic Animation in SVG", Feb. 26, 2008, pp. 1-3; http://www.design-ireland.net/article/Basic_Animation_in_SVG.*

*Primary Examiner* — Cesar Paula
*Assistant Examiner* — David Faber
(74) *Attorney, Agent, or Firm* — Fitzpatrick, Cella, Harper & Scinto

(57) ABSTRACT

A structured document including a first element which includes an attribute that handles values as character strings, and a second element which defines a change of the values of the attribute is acquired. The attribute is extracted from the first element, and the extracted attribute is converted into a child element of the first element. The second element is converted into a third element which defines a change of the values of the attribute converted into the child element. The structured document updated by the conversions is output as a structured document.

11 Claims, 6 Drawing Sheets

U.S. PATENT DOCUMENTS

| | | | |
|---|---|---|---|
| 2007/0097404 A1* | 5/2007 | Ataka | 358/1.13 |
| 2007/0250823 A1* | 10/2007 | Kono | 717/143 |
| 2008/0180409 A1* | 7/2008 | Matsuda | 345/177 |
| 2008/0256439 A1* | 10/2008 | Boreham et al. | 715/246 |
| 2009/0083298 A1* | 3/2009 | Ishizaki | 707/101 |
| 2009/0083315 A1* | 3/2009 | Ishizaki et al. | 707/103 R |

* cited by examiner

F I G. 3A
```
<path fill = "gray" stroke = "black" stroke-width = "4"
d = "M 20 110 Q 20 300 220 110 L 120 10 Z"/>
```
F I G. 3B
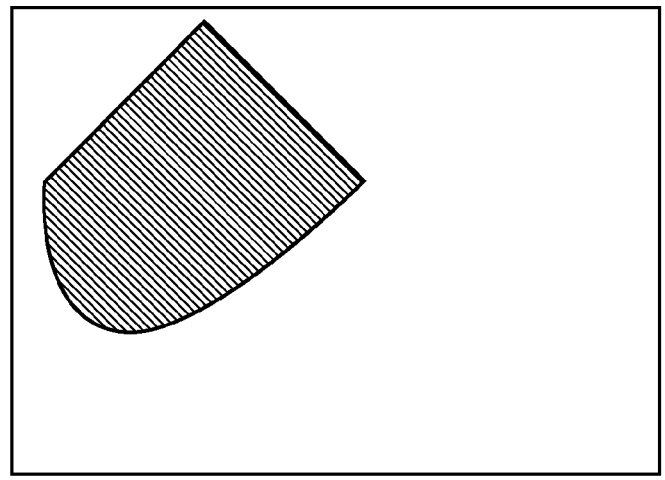

```
<path fill = "gray" stroke = "black" stroke-width = "4"
d = "M 108.5, 38.5 L 123.5, 26.5 L 148.5, 16.5 L 172.5, 17.5 L
188.5, 19.5 L 202.5, 23.5 L 206.5, 26.5 L 210.5, 37.5 L 213.5, 44.5
L 215.5, 57.5 L 209.5, 68.5 L 203.5, 81.5 L 187.5, 98.5 L
164.5, 120.5 L 206.5, 121.5 L 224.5, 121.5 L 220.5, 149.5 L
194.5, 147.5 L 181.5, 147.5 L 167.5, 146.5 L 150.5 147.5 L
133.5, 149.5 L 117.5, 148.5 L 117.5, 136.5 L 118.5, 124.5 L
133.5, 115.5 L 151.5, 97.5 L 170.5, 78.5 L 186.5, 59.5 L
179.5, 43.5 L 159.5, 35.5 L 139.5, 40.5 L 125.5, 49.5 Z"/>
```

```
<svg width = "400" height = "300" xmlns = "http://www.w3.org/2000/svg">

<path fill = "gray" stroke = "black" stroke-width = "4"
        d = "M 20 110 Q 20 300 220 110 L 120 10 Z"/>

<animate fill = "freeze" begin = "2s" dur = "3s" attributeName = "d"
                 values = "M 20 110 Q  20 300 220 110 L 120 10 Z;
                           M 20 110 Q 120 300 220 110 L 120 10 Z;
                           M 20 110 Q 220 300 220 110 L 120 10 Z;
                           M 20 110 Q 320 300 220 110 L 120 10 Z"/>    ⎬―501

</path>

</svg>
```

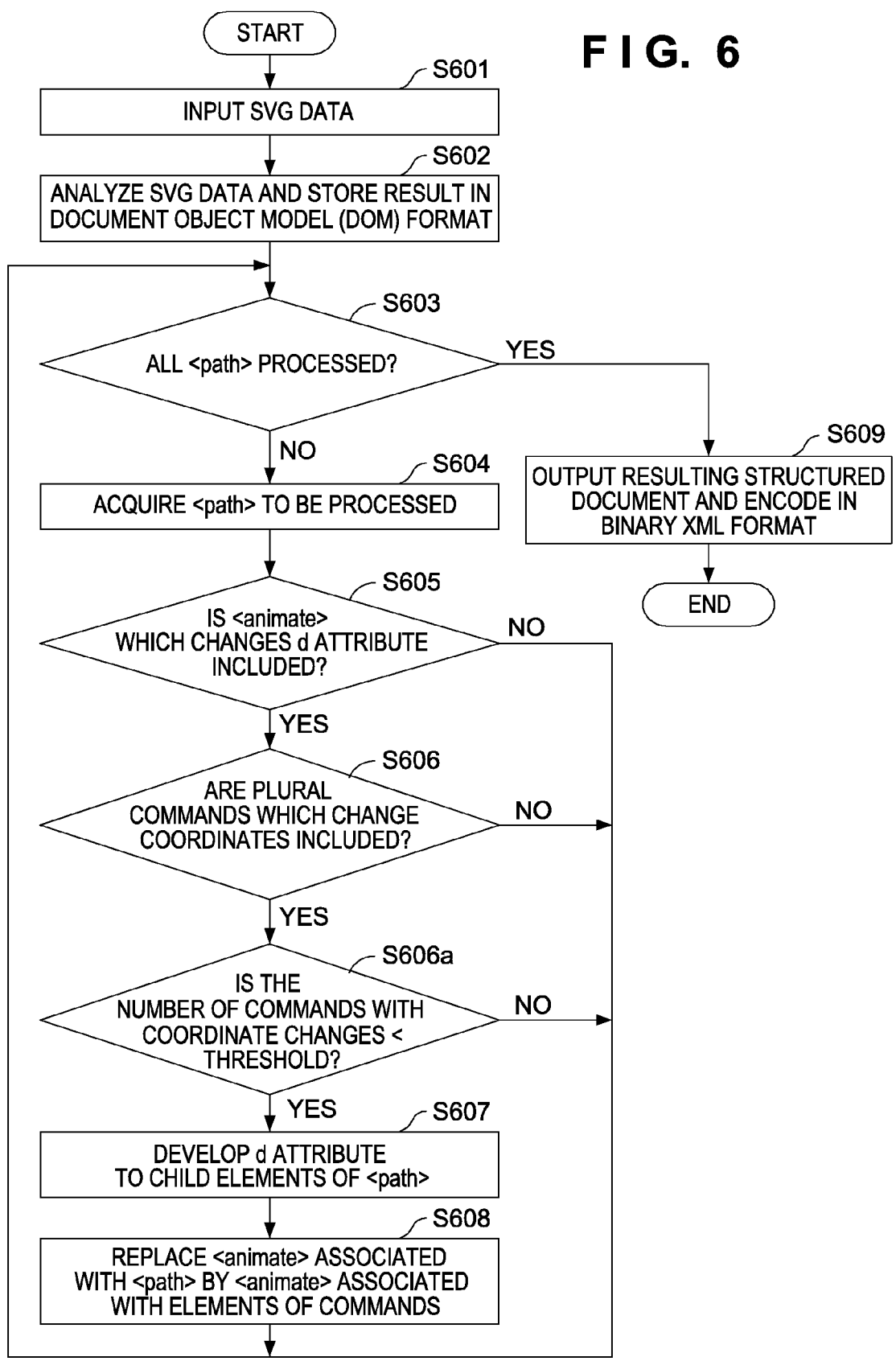

FIG. 7A

```
<path fill = "gray" stroke = "black" stroke-width = "4"
    <d >
        <M  x1 = "20" y1 = "110"/>
        <Q  x1 = "20" y1 = "300" x2 = "220" y2 = "110"/>
        <L  x1 = "120" y1 = "10"/>
        <Z/>
    </d >
</path>
```
~701

FIG. 7B

```
<path fill = "gray" stroke = "black" stroke-width = "4"
    <d >
        <M  x1 = "20" y1 = "110"/>
        <Q  x1 = "20" y1 = "300" x2 = "220" y2 = "110"/>
            <animate attributeName = "x1" values = "20; 120; 220; 320"
                fill = "freeze" begin = "2s" dur = "3s"/>
        </Q>
        <L  x1 = "120" y1 = "10"/>
        <Z/>
    </d >
</path>
```
~801

INFORMATION PROCESSING APPARATUS AND INFORMATION PROCESSING METHOD

BACKGROUND OF THE INVENTION

1. Field of the Invention

The present invention relates to a technique for processing a structured document.

2. Description of the Related Art

In recent years, opportunities for handling structured documents are increasing in compact devices such as mobile phones and digital cameras. Also, the data sizes of structured documents to be handled are increasing, and a demand has arisen for attaining high-speed processing of structured documents in environments in which the capacities of memories and storage devices are limited or CPUs have poor processing speeds.

XML structured documents can have a data structure of a tree structure, which is hierarchized by embedding tags in a document. However, when layers become deeper, a large memory capacity is required to store them, and data accesses worsen. As a result, a problem is posed whereby high-speed processing of structured documents is frustrated. Hence, a method of relating an element name of a child element to that of a parent element to replace the parent element with a new element, so as to shorten the hierarchy of the tree structure has been proposed (Japanese Patent Laid-Open No. 2002-297569).

However, with the above method, size-reduction and speed-up effects do not suffice in processing of devices with few resources. To encode data by an XML language, even when data described as an attribute value or element contents is an integer or decimal number, it has to be encoded as characters. At this time, such data requires a larger data size than when it is encoded as a binary expression, resulting in a longer decode time.

In contrast, a technique embodied in binary XML and represented by the Fast Infoset (ISO/IEC24824-1) specification designed by the ISO, is available. Since binary XML can encode an attribute value and element contents in a binary format such as an integer and decimal number suited to their original data types, data size can be reduced, thus speeding up the decode processing.

However, when an attribute value and element contents are described as values of complicated data structures, it is difficult to generally recognize the data structures and to encode them. Hence, such attribute value and element contents have to be encoded as a series of character strings like text XML. For example, SVG data as a vector graphics format can assume complicated values, such as a combination of a drawing command and coordinate information as attribute values. When most document data is occupied by such values, binary XML provides nearly no reduction in data size or analysis processing speedup. Further, when document data includes instructions to alter such attribute values depending upon an amount of elapsed time, the amount of data to be handled as intact character strings increases, thus further reducing the efficiency of the binary XML.

When a structured document includes many attributes that assume values of complicated data structures, the effects of a reduced data size and a speedup of analysis processing cannot be sufficiently obtained when using the encoding.

SUMMARY OF THE INVENTION

The present invention has been made in consideration of the aforementioned problems, and provides a technique for speeding up the processing of a structured document including many attributes having complicated data structures as values.

According to one aspect of the present invention, there is provided an information processing apparatus comprising: an acquisition unit which acquires a structured document including a first element which includes an attribute that handles values as character strings, and a second element which defines a change of the values of the attribute; a first conversion unit which extracts the attribute from the first element, and converts the extracted attribute into a child element of the first element; a second conversion unit which converts the second element into a third element which defines a change of the values of the attribute converted into the child element; and an output unit which outputs, as an output structured document, the structured document updated by the conversions of the first conversion unit and the second conversion unit.

According to another aspect of the present invention, there is provided an information processing method wherein comprising: an acquisition step of acquiring a structured document including a first element which includes an attribute that handles values as character strings, and a second element which defines a change of the values of the attribute; a first conversion step of extracting the attribute from the first element, and converting the extracted attribute into a child element of the first element; a second conversion step of converting the second element into a third element which defines a change of the values of the attribute converted into the child element; and an output step of outputting the structured document updated by the conversions in the first conversion step and the second conversion step as an output structured document.

Further features of the present invention will become apparent from the following description of exemplary embodiments with reference to the attached drawings.

BRIEF DESCRIPTION OF THE DRAWINGS

FIGS. 3A and 3B are views showing an example of a description of a path element of SVG data;

FIG. 6 is a flowchart of processing to be executed by the information processing apparatus; and FIGS. 7A and 7B are views for explaining conversion of SVG data.

DESCRIPTION OF THE EMBODIMENTS

Embodiments of the present invention will be described hereinafter with reference to the accompanying drawings. Note that each of the embodiments to be described hereinafter is an example when the present invention is practiced, and is one of practical embodiments of the arrangement described in the scope of the claims.

Figure 1:
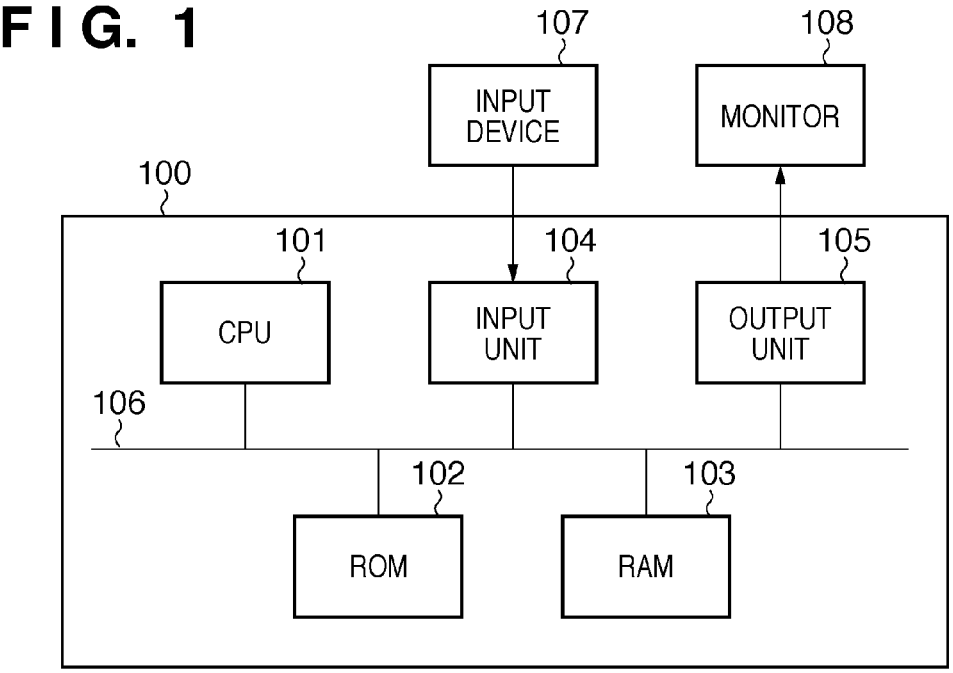
FIG. 1 is a block diagram showing an example of the hardware arrangement of an information processing apparatus.

Embodiments to be described hereinafter will explain an information processing apparatus which processes structured documents. An example of the hardware arrangement of an information processing apparatus according to this embodiment will be described first with reference to FIG. 1.

A CPU 101 controls an overall information processing apparatus 100 using computer programs and data stored in a ROM 102 and RAM 103 and executes respective processes to be described later as those which are to be implemented by the information processing apparatus 100. The ROM 102 is an example of a computer-readable storage medium, and stores setting data, a boot program, and the like of the information processing apparatus 100.

The RAM 103 is an example of a computer-readable storage medium, and has an area used to temporarily store computer programs and data required to make the CPU 101 execute respective processes to be described later as those which are to be implemented by the information processing apparatus 100. Also, the RAM 103 has a work area used when the CPU 101 executes various processes. That is, the RAM 103 can provide various areas as needed.

An input unit 104 notifies the CPU 101 of instruction information which is input by the user by operating an input device 107. The input device 107 includes devices such as a keyboard and mouse, and any other devices may be used as long as they allow the user to make input operations.

An output unit 105 outputs information as a processing result of the information processing apparatus 100 to a monitor 108. Of course, the output destination of the information is not limited to the monitor 108, but it may be a network such as a LAN or the Internet or a printing apparatus such as a printer. The monitor 108 includes a CRT or liquid crystal display, and performs a display based on the information output from the output unit 105.

The CPU 101, input unit 104, output unit 105, ROM 102, and RAM 103 are respectively connected to a bus 106. Note that the hardware arrangement of the information processing apparatus 100 is not limited to this. For example, an external storage device used to store and hold computer programs and data may be further connected to the information processing apparatus 100. As this external storage device, a device for reading information recorded on storage media such as a flexible disk, optical disk, magneto-optical disk, CD-ROM, CD-R, magnetic tape, memory card, and DVD, and a hard disk drive can be applied.

Figure 2:
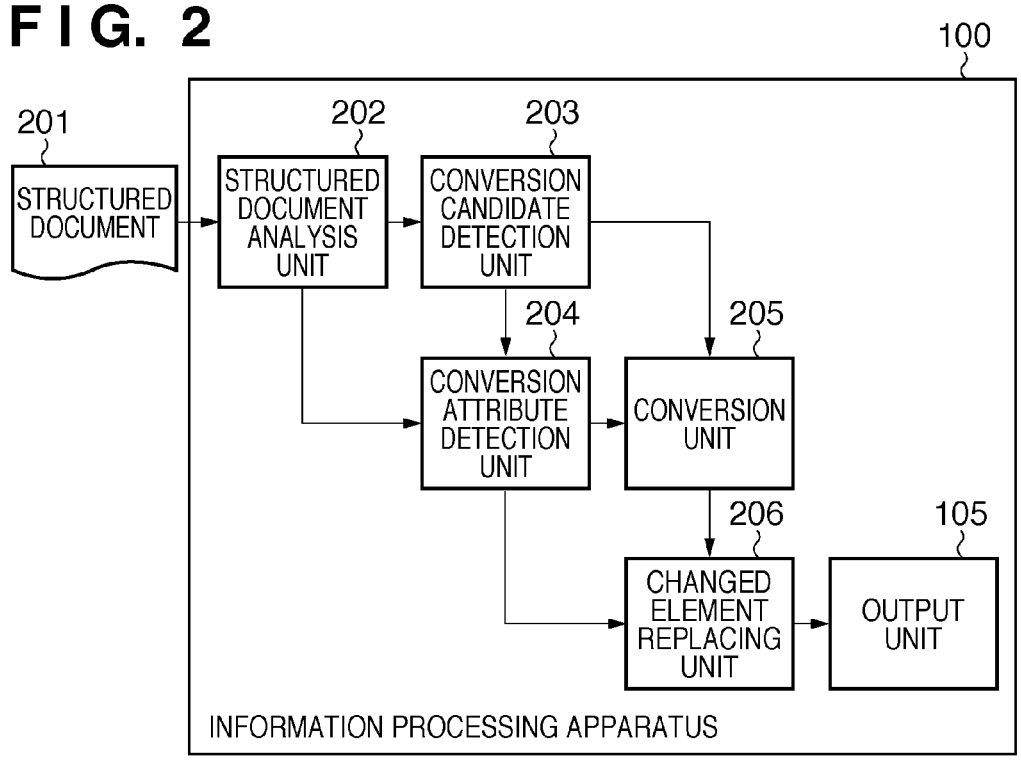
FIG. 2 is a block diagram showing an example of the functional arrangement of the information processing apparatus.

An example of the functional arrangement of the information processing apparatus 100 will be described below with reference to FIG. 2. Assume that in this embodiment, a structured document analysis unit 202, conversion candidate detection unit 203, conversion attribute detection unit 204, conversion unit 205, and changed element replacing unit 206 shown in FIG. 2 are stored in the form of computer programs in the RAM 103. However, even when some or all of these units are implemented by hardware, the gist of the following description remains unchanged.

The structured document analysis unit 202 acquires a structured document 201 input to the information processing apparatus 100 from an external storage device, network, or the user. The structured document analysis unit 202 analyzes the acquired structured document 201, and outputs the analysis result to the subsequent conversion candidate detection unit 203 and conversion attribute detection unit 204.

The conversion candidate detection unit 203 detects, from the structured document 201, an element (first element) including an attribute, which handles a numerical value string (value) as a character string, as a conversion candidate using the analysis result by the structured document analysis unit 202.

The conversion attribute detection unit 204 detects, from the structured document 201, an element (second element), which defines a transition of attribute values of the element as the conversion candidate detected by the conversion candidate detection unit 203, as a conversion attribute using the analysis result by the structured document analysis unit 202.

The conversion unit 205 determines based on the conversion attribute detected by the conversion attribute detection unit 204 whether or not the "attribute which handles a numerical value string (value) as a character string" included in the conversion candidate detected by the conversion candidate detection unit 203 is to be converted into a child element of this conversion candidate. When the conversion unit 205 determines that the attribute is to be converted, it generates an output structured document in which the "attribute which handles a numerical value string (value) as a character string" in the structured document 201 is converted into a child element of the conversion candidate. The output structured document may be overwritten on the structured document 201 or may also be generated independently of the structured document 201.

The changed element replacing unit 206 updates the output structured document by adding, as a further child element of the child element converted by the conversion unit 205, an attribute based on a conversion attribute corresponding to this child element. The output unit 105 may output the output structured document updated by the changed element replacing unit 206 intact or after encoding.

The operations of the respective units shown in FIG. 2 will be described in more detail below while making use of a practical example. Thus, it should be noted that the operations of the respective units shown in FIG. 2 do not limit those in the practical example to be described below, and are for the exemplary purpose only.

In the following description, the structured document 201 will be described as SVG data. As is known to those who are skilled in the art, SVG data includes an element which is called a path element and defines an outline of a drawing element (graphics image). The path element further includes a d attribute, which includes coordinate information (coordinate values for respective coordinate components) that defines the drawing element, and drawing commands that instruct to implement drawing using the coordinate information. More specifically, the d element is expressed by a complicated data configuration in which drawing commands which express a straight line, curve, start point, and end point, and pieces of coordinate information used for drawing together with these drawing commands are serially written. For this reason, the values (attribute values) of the d attribute are handled as a character string.

An example of a description of a path element of SVG data will be described below with reference to FIG. 3A. As described above, the path element includes the d attribute in which an M command expresses a start coordinate, a Q command expresses a quadratic bezier curve, an L command expresses a straight line, and a Z command expresses to couple the end point and start point. By analyzing and drawing such SVG data, a graphics image shown in FIG. 3B is drawn.

Figures 4A, 4B:
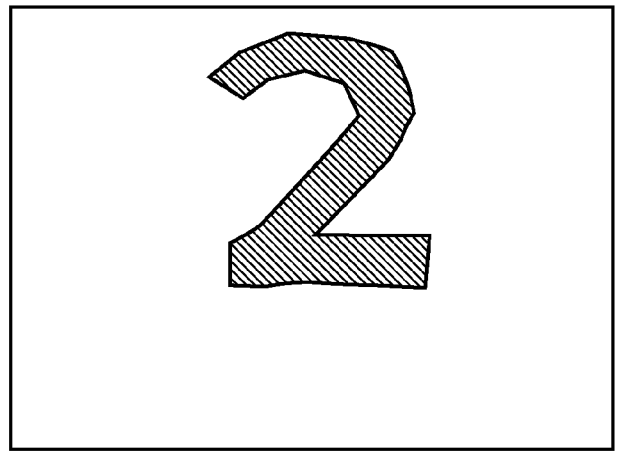
FIGS. 4A and 4B are views showing an example of a description of a path element of SVG data.

An example of a description of a path element which expresses a complicated graphics image by setting many control points will be described below with reference to FIG. 4A. In this example, only M, L, and Z commands are used as drawing commands. However, as a graphics image to be expressed becomes complicated, the numbers of values and commands to be handled as the d attribute increase. By analyzing and drawing SVG data shown in FIG. 4A, a graphics image shown in FIG. 4B is drawn.

An example of an SVG description which changes the values (coordinate values in one or more coordinate components) of a d attribute of a path element as an elapse of time will be described below with reference to FIG. 5A. In SVG data shown in FIG. 5A, an animate element 501 required to animate the values of the d attribute is added as a child element of the path element shown in FIG. 3A.

Values of a values attribute of the animate element 501 indicate coordinate positions at the time of drawing of respective vertices that define a graphics image to be drawn to have semicolons as delimiters. That is, the values element is a child element of the animate element 501, and is an element which defines time-series changes of the values of the d attribute. The animate element 501 expresses that the values of the d attribute are animated via a shape expressed by the values attribute during 3 seconds 2 seconds after the graphics image is drawn first.

Figures 5A, 5B:
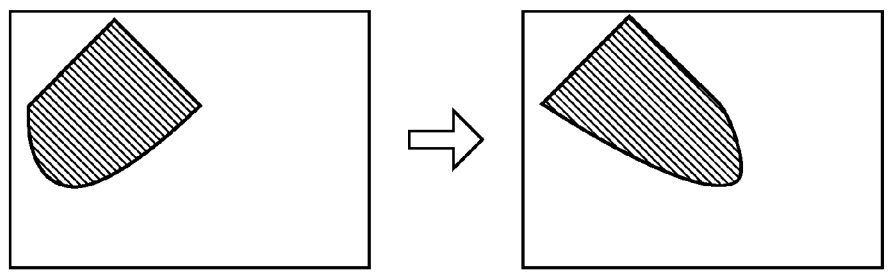
FIGS. 5A and 5B are views showing an example of a description to animate a d attribute of a path element of SVG data.

The left image of FIG. 5B shows a graphics image 2 seconds after the graphics image is drawn first, and the right image shows a graphics image 5 seconds after the graphics image is drawn first. Since the values attribute has a complicated data structure as attribute values as in the d attribute, the attribute values have to be handled as character strings.

In the example shown in FIGS. 5A and 5B, the simple shape expressed by the path element is animated. However, in order to obtain a higher expressive power, since the shape of a graphics image is complicated, the values of the d attribute and those of the values attribute are also complicated. In particular, the values of the values attribute include more redundant and overlapping character strings with decreasing number of coordinates to be changed along with the time. For this reason, even when SVG data is encoded for the purpose of size compression and speed-up of processing like binary XML data, the effects are harder to obtain.

Hence, this embodiment processes this SVG data for the purpose of shrinking the SVG data size and reducing the nest depth in the description of the data contents. This processing will be described below with reference to FIG. 6.

Note that computer programs and data for making the CPU 101 execute processes according to the flowchart shown in FIG. 6 are stored in the RAM 103. Such computer programs include those which make the CPU 101 implement functions corresponding to the structured document analysis unit 202, conversion candidate detection unit 203, conversion attribute detection unit 204, conversion unit 205, and changed element replacing unit 206. Then, when the CPU 101 executes processes using these computer programs, the information processing apparatus 100 implements the respective processes to be described below.

In step S601, SVG data as the structured document 201, which is input to this apparatus by the input device 107 or other means, is acquired in the RAM 103. Assume that the SVG data having the format shown in FIG. 5A is acquired in this case.

In step S602, the acquired SVG data is analyzed, and the analysis result is stored in the RAM 103 as data having a Document Object Model (DOM) format. Note that the SVG data is converted into the DOM format as an example. However, the SVG data may be converted into other formats as long as the following processes can be implemented.

It is then checked in step S603 whether or not all path elements included in the SVG data have been processed. As a result of checking, if all the path elements have been processed, this processing ends and flow branches to step S609 as described below; if the path elements to be processed still remain, the process advances to step S604.

Note that this embodiment limits processing to the path elements for the sake of simplicity. However, processing is not limited to the path elements as long as elements have attributes of complicated data structures. The user may designate elements and attributes to be processed in advance like in this embodiment. Alternatively, elements each having an attribute of a complicated data structure as values may be extracted based on DOM data as the analysis result as those to be processed.

In step S604, a path element to be processed is defined. In general, the SVG data is referred to from the beginning of the data to define a path element to be processed.

It is checked in step S605 with reference to the path element defined in step S604 whether or not child elements of the path element include that which changes values of a d attribute. This embodiment will exemplify an animate element as the child element which changes the values of the d attribute. However, elements other than the animate elements may be used as long as they change the values of the d attribute.

As a result of checking, if the child elements of the path element include that which changes the values of the d attribute, the process advances to step S606; otherwise, the process returns to step S603.

It is checked in step S606 if a values attribute of the animate element includes a plurality of drawing commands whose coordinate values are changed. In this case, it is confirmed for respective semicolons whether or not the coordinate values of respective drawing commands are changed.

The reason why the number of drawing commands whose coordinate values are changed is used as a discriminant criterion is that the number of elements to be converted into child elements increases with increasing number of drawing commands whose coordinate values are changed. Since the attribute values of the element after conversion are converted into a simple numerical value or a character string shorter than the attribute values before conversion, a format suitable for an encoding such as binary XML is obtained. However, since the number of elements to be processed by tracing the DOM tree increases as the internal format, even when each element is converted into a format suited to encoding, speed-up of the processing cannot be expected.

In this embodiment, it is discriminated in step S606 whether or not there are a plurality of drawing commands whose coordinate values are changed. However, as shown in step S606a, a threshold may be set for the number of drawing commands whose coordinate values are changed, and when the number of drawing commands whose coordinate values are changed is greater than or equal to the threshold, it may be determined to skip the conversion. On the other hand, when the number of drawing commands whose coordinate values are changed is less than the threshold, the conversion is performed.

Furthermore, a change in size of a drawing area of the path element which is caused when the values of the d attribute are changed by the animate element may be acquired, and when the acquired changed size is greater than or equal to a threshold, it may be determined to continue the conversion. By discriminating based on the changed area of the drawing result whether or not to continue the conversion, drawing processing can be skipped for elements which are not changed between frames when they are converted into child elements, thus speeding up the overall processing.

Furthermore, in step S606, the number of DOM nodes to be generated after conversion may be calculated, and when the number of DOM nodes is greater than or equal to a threshold which is set in advance, it may be determined to skip the conversion. The reason why the number of DOM nodes after conversion is used as a criterion is that the number of elements to be processed by tracing the DOM tree increases as the internal format, and speed-up of the processing cannot be expected even when elements are converted into the format suited to encoding, as described above.

In step S607, the d attribute in the path element is converted as a child element of the path element (first conversion). This processing will be described below with reference to FIG. 7A. Initially, in FIG. 5A, the d attribute in the path element is analyzed to decompose the d attribute into sets of <drawing command, coordinate information> (no coordinate information for a drawing command Z). In case of FIG. 5A, the d attribute is decomposed into sets of <M 20 110>, <Q 20 300 220 110>, <L 120 10>, and <Z>. Next, the d attribute is deleted from attributes of the path element, and a new d attribute is added as a child element of the path element. Then, as child elements of this d attribute, the decomposed sets are added in the original description order. That is, in case of FIGS. 5A, M, Q, L, and Z elements are added in turn.

A frame 701 in FIG. 7A indicates a result obtained when the process in step S607 is applied to the path element of the SVG data shown in FIG. 5A. Note that FIG. 7A is presented for the purpose of explaining the processing result in step S607, and other elements are not shown.

In step S608, the animate element as the child element of the path element is converted into an element (third element) which defines changes of values of the "attribute converted into the child elements in step S607" (second conversion).

In this processing, the animate element is deleted from the SVG data. Then, drawing commands corresponding to coordinate values which change time-serially are defined from the values attribute based on the analysis result in step S602 (Q in case of FIG. 5A). Then, an animate element required to change the attribute values of the child elements converted in step S607 is generated using the "coordinate values which change time-serially" in association with the specified drawing commands, and is added as a child element.

For example, in case of FIG. 5A, the coordinate values in coordinate components x1 of the Q element dynamically change. In this case, as a child element 801 of the Q element, an animate element required to dynamically change the coordinate components x1 of the Q element is generated, as shown in FIG. 7B.

Upon completion of the processing according to the flowchart shown in FIG. 6, flow branches to step S609 where the SVG data is edited by the aforementioned various conversion processes, and an output structured document is generated as the edit result. Then, the CPU 101 outputs this structured document to the output destination such as the monitor 108.

As described above, according to this embodiment, the values, which are handled as long character strings, of the d attribute of the path element and the values attribute of the animate element as the child element of the path element are converted into a format suited to encoding. In case of FIG. 7B, only the values attribute of the animate element as the child element of the Q element is handled as a character string after conversion. Unlike the animate element associated with the d attribute of the path element, the value of the values attribute of the animate element associated with the x1 attributes of the Q element becomes greatly shortened, thus enhancing the size compression efficiency as a result of encoding. Since each attribute value is converted from a long character string into a simple numerical value or short character string, a high compression ratio and speed-up of the processing can be achieved upon encoding by, for example, binary XML.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-117051 filed May 13, 2009 which is hereby incorporated by reference herein in its entirety.

What is claimed is:

1. An information processing apparatus comprising:
an acquisition unit which acquires a structured document including a first element which includes an attribute that handles values as character strings and that includes a plurality of sets, each set including a drawing command and coordinate information;
a first determination unit which determines whether or not the structured document includes a second element which defines a transition of pieces of coordinate information corresponding to respective drawing commands;
a second determination unit which determines whether or not a number of drawing commands corresponding to pieces of coordinate information which change time-serially is less than a predetermined number;
a first conversion unit which, if the structured document includes the second element and the number of drawing commands corresponding to pieces of coordinate information which change time-serially is less than the predetermined number, extracts the attribute from the first element, and converts the extracted attribute into a child element of the first element;
a second conversion unit which, if the structured document includes the second element and the number of drawing commands corresponding to pieces of coordinate information which change time-serially is less than the predetermined number, converts the second element into a third element which defines a transition of pieces of the coordinate information which change time-serially and are included the attribute converted into the child element; and
an output unit which outputs, as an output structured document, the structured document updated by the conversions of said first conversion unit and said second conversion unit;
wherein one or more of the foregoing units are comprised of one or more processing units programmed in accordance with stored instructions.

2. The apparatus according to claim 1, wherein said first conversion unit extracts each of the plurality of sets from the first element, and converts the extracted sets into child elements of the first element.

3. The apparatus according to claim 1, wherein with respect to the drawing commands corresponding to pieces of coordinate information which change time-serially from the second element, said second conversion unit converts each set including the drawing commands into the third element as a child element of the child element converted by said first conversion unit in association with that set.

4. The apparatus according to claim 1, wherein the third element is a child element of the child element converted by said first conversion unit.

5. The apparatus according to claim 1, wherein the structured document is a structured document of one of XML and SVG formats.

6. The apparatus according to claim 1, wherein said output unit converts the output structured document into a binary XML format, and outputs the converted output structured document.

7. The apparatus according to claim 1, wherein said acquisition unit holds the acquired structured document in a DOM format.

8. An information processing method comprising:
an acquisition step of acquiring a structured document including a first element which includes an attribute that handles values as character strings and that includes a plurality of sets, each set including a drawing command and coordinate information;
a first determination step of determining whether or not the structured document includes a second element which defines a transition of pieces of coordinate information corresponding to respective drawing commands;
a second determination step of determining whether or not a number of drawing commands corresponding to pieces of coordinate information which change time-serially is less than a predetermined number;
a first conversion step of, if the structured document includes the second element and the number of drawing commands corresponding to pieces of coordinate information which change time-serially is less than the predetermined number, extracting the attribute from the first element, and converting the extracted attribute into a child element of the first element;
a second conversion step of, if the structured document includes the second element and the number of drawing commands corresponding to pieces of coordinate information which change time-serially is less than the predetermined number, converting the second element into a third element which defines a transition of pieces of the coordinate information which change time-serially and are included in the attribute converted into the child element; and
an output step of outputting the structured document updated by the conversions in the first conversion step and the second conversion step as an output structured document.

9. A non-transitory computer-readable storage medium storing a computer program which, when executed, causes a computer to function:
an acquisition unit which acquires a structured document including a first element which includes an attribute that handles values as character strings and that includes a plurality of sets, each set including a drawing command and coordinate information;
a first determination unit which determines whether or not the structured document includes a second element which defines a transition of pieces of coordinate information corresponding to respective drawing commands;
a second determination unit which determines whether or not a number of drawing commands corresponding to pieces of coordinate information which change time-serially is less than a predetermined number;
a first conversion unit which, if the structured document includes the second element and the number of drawing commands corresponding to pieces of coordinate information which change time-serially is less than the predetermined number, extracts the attribute from the first element, and converts the extracted attribute into a child element of the first element;
a second conversion unit which, if the structured document includes the second element and the number of drawing commands corresponding to pieces of coordinate information which change time-serially is less than the predetermined number, converts the second element into a third element which defines a transition of pieces of the coordinate information which change time-serially and are included the attribute converted into the child element; and
an output unit which outputs, as an output structured document, the structured document updated by the conversions of said first conversion unit and said second conversion unit.

10. The apparatus according to claim 1, wherein the first and second conversion units do not operate if the structured document does not include the second element or the number of drawing commands corresponding to pieces of coordinate information which change time-serially is equal to or more than the predetermined number.

11. The method according to claim 8, wherein the first and second conversion steps are not performed if the structured document does not include the second element or the number of drawing commands each corresponding to pieces of coordinate information which change time-serially is equal to or more than the predetermined number.

* * * * *